310-11 SR SEARCH ROOM
FIP8502 OR 3,215,870

Inventor
Edward F. Brill
By Thomas F. Kirby
Attorney

Nov. 2, 1965 E. F. BRILL 3,215,870

INSULATING MEANS FOR FLOW CHANNEL IN MHD DEVICE

Filed Dec. 26, 1961 9 Sheets-Sheet 2

Inventor
Edward F. Brill
By Thomas F. Kirby
Attorney

Nov. 2, 1965 E. F. BRILL 3,215,870

INSULATING MEANS FOR FLOW CHANNEL IN MHD DEVICE

Filed Dec. 26, 1961 9 Sheets-Sheet 3

Inventor
Edward F. Brill
By Thomas F. Kirby
Attorney

Inventor
Edward F. Brill
By Thomas F. Kirby
Attorney

Inventor
Edward F. Brill
By Thomas F. Kirby
Attorney

Inventor
Edward F. Brill
By Thomas F. Kirby
Attorney

INSULATING MEANS FOR FLOW CHANNEL IN MHD DEVICE

Inventor
Edward F. Brill
By Thomas F. Kirby
Attorney

Nov. 2, 1965 E. F. BRILL 3,215,870

INSULATING MEANS FOR FLOW CHANNEL IN MHD DEVICE

Filed Dec. 26, 1961 9 Sheets-Sheet 8

Inventor
Edward F. Brill
By Thomas F. Kirby
Attorney

Nov. 2, 1965 E. F. BRILL 3,215,870

INSULATING MEANS FOR FLOW CHANNEL IN MHD DEVICE

Filed Dec. 26, 1961 9 Sheets-Sheet 9

Inventor
Edward F. Brill
By Thomas F. Kirby
Attorney

United States Patent Office 3,215,870

Patented Nov. 2, 1965

3,215,870

INSULATING MEANS FOR FLOW CHANNEL IN MHD DEVICE

Edward F. Brill, Brookfield, Wis., assignor to Allis-Chalmers Manufacturing Company, Milwaukee, Wis.

Filed Dec. 26, 1961, Ser. No. 161,785

7 Claims. (Cl. 310—11)

This invention relates generally to magnetohydrodynamic (MHD) devices. More particularly it relates to improvements in insulating means for flow channels in MHD devices.

The MHD principle of generating electrical power by moving an electrically conductive fluid, such as a hot ionized gas or plasma, through a magnetic field has been known for some time. Experimental generators employing this principle and capable of generating small amounts of electrical power for short periods of time have been built and operated. Such generators usually comprise an elongated, heat resistant, electrically insulated flow channel through which the hot ionized gas or plasma is blown, electromagnetic means outside of the flow channel for providing a magnetic field in the flow channel, and electrodes inside the flow channel along two opposite walls thereof for collecting the current generated in the gas or plasma as it moves through the magnetic field. Although the gas stream has a temperature of about 5000° F., for example, and is moving at near sonic speed, such generators are relatively small in size and are designed for short intermittent test runs. Therefore, it is possible to fabricate the nonconductive portions of the flow channel from water cooled metallic members which are coated with ceramic or materials such as zirconia, magnesia or the like. In use, the nonconductive portions of the channel are subjected to burning, ablation and general deterioration but are easily and economically replaced when no longer serviceable.

Heretofore, there have been several drawbacks to the development of efficient, large scale MHD devices such as MHD electrical generators capable of continuously producing commercially significant amounts of electrical power, i.e., 100 megawatts and above.

For example, thermal efficiency poses serious problems. Generally speaking, in thermal power conversion, the higher the temperature of the power producing media (steam, gas, plasma, etc.) the higher the efficiency that results. Since MHD devices such as electrical generators primarily comprise stationary components, it is possible to use higher temperature media than is used in conventional complex rotating machinery of comparable size. However, to obtain maximum efficiency it is necessary that the MHD devices be designed and constructed so that heat losses from within are reduced to a minimum.

Another serious drawback has been the lack of construction materials able to withstand for long periods of time the extremely high temperatures and high gas velocities involved in high powered MHD devices. No commercially available materials in themselves are well suited for use in defining the flow channel and acting as insulating means therein. Since there is an oxidizing atmosphere in the flow channel, a large number of ceramic materials and so-called intermetallics tend to disintegrate when subjected to prolonged use and are therefore not suitable as insulating liners or structural members. Certain materials, such as magnesium oxide, thorium oxide, beryllium oxide and other fully oxidized materials are thermodynamically stable in high temperature oxidizing atmospheres but tend to become electrically conductive and lose their value as electrical insulation unless this effect can be overcome.

Then, too, there have been designed difficulties encountered in trying to cope with special phenomena peculiar to MHD devices which reduce the efficiency thereof. The Hall effect (i.e., induced current components in the direction of the gas flow), for example, reduces operating efficiency.

Accordingly, it is an object of this invention to provide improved insulating means for use in the flow channel in MHD devices such as electrical generators which overcome the aforesaid problems and have other important advantages.

Another object is to provide improved insulating means of the aforesaid character which comprise heat resistant members having passages therein for accommodating the flow of nonconductive gas to effect cooling of the members and to afford an insulating film of gas along the surface of the members.

Another object is to provide heat resistant members of the aforesaid character which are adapted to line the sides of the flow channel in an MHD device and have gas passages therein which communicate through a multiplicity of louvers with the flow channel.

Another object is to provide heat resistant members of the aforesaid character having a serrated or slotted surface which is adapted to reduce electrical conductivity thereacross and to reduce Hall effects in the flow channel.

Another object is to provide heat resistant members of the aforesaid character which have a modular form which aids in their insertion and removal from the MHD device.

Other objects and advantages of the invention will hereinafter appear.

A typical MHD device, such as an electrical generator, incorporating the present invention comprises a body portion having an axial passageway therethrough. Electromagnetic means are provided to establish a magnetic field transversely through the passageway. Insulating means constructed in accordance with the present invention and in the form of heat resistant blocks are arranged within the passageway to define two opposite walls of a flow channel for hot electrically conductive gases. Each block has one or more internal passages which communicate with the flow channel through louvers on the face of the block. Pressurized air or other electrically nonconductive gas from a source outside the generator is supplied to the passages in each block and flows through the louvers thereof to provide a film of cooling and insulating gas on the face of the block which prevents the hot gases in the flow channel from making direct contact with the surface of the block.

A plurality of individual electrode members are arranged within the passageway in the body portion of the generator and substantially define the other two opposite sides of the flow channel. In further accordance with the invention additional insulating means similar to the blocks described above are interposed between adjacent individual electrode members to complete the side walls of the flow channel and to insulate the electrode members of the same polarity from each other. The blocks comprising the aforesaid additional insulating means make physical contact with certain of the blocks comprising the two walls of the flow channel so that the passages in the latter blocks register with the passages in the former blocks. In this manner nonconductive gas is supplied to the additional insulating means.

The accompanying drawings illustrate a preferred embodiment of the invention but it is to be understood that the embodiment illustrated is susceptible of modification with respect to certain details thereof without departing from the scope of the appended claims.

Figure 1:
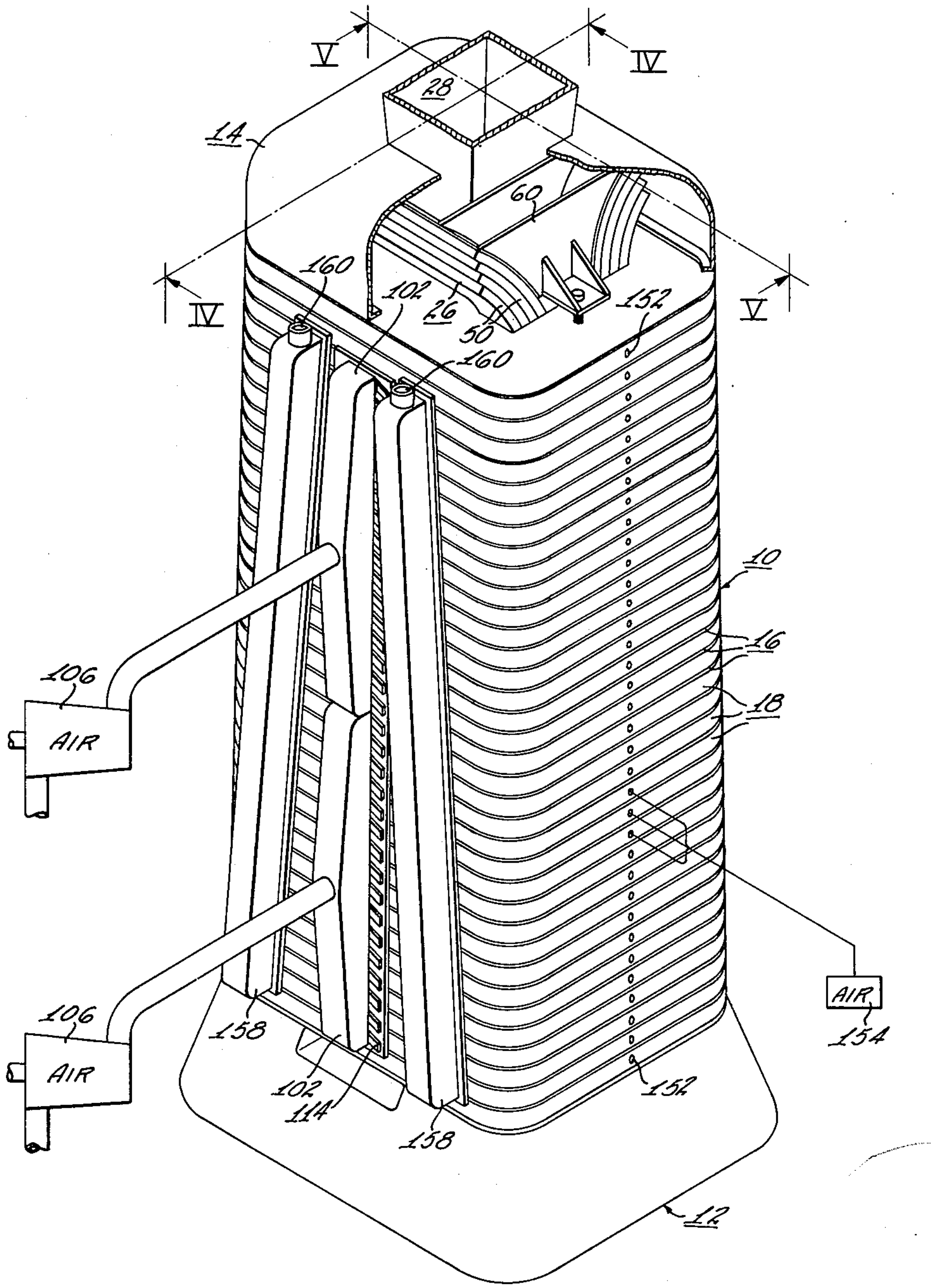
FIG. 1 is an isometric view of the exterior of an MHD electrical power generator incorporating the present invention.

FIG. 1 shows the exterior of a large MHD electrical power generator incorporating the present invention. It may be assumed, for example, that the generator is adapted to deliver about 265 megawatts of D.C. electrical power at 2000 volts, is about 60 feet high, 22 feet wide and 18 feet deep, and weighs about 3500 tons. The generator is constructed of modular components to facilitate its manufacture, assembly and subsequent servicing. Preferably, the generator is vertically mounted to facilitate its assembly and to effect economies in the size, arrangement, cost and efficiency of the power plant in which it is incorporated.

*The generator body portion*

The generator comprises a hollow body portion 10 which is vertically supported on a base member 12 and is provided with a cover member 14. Body portion 10 which is fabricated of steel or other magnetizable material, is part of the magnetic circuit of the generator and also affords mechanical support for other components of the generator which will hereinafter be described.

FIGS. 1 through 5 show that, in keeping with the modular concept of construction, body portion 10 comprises a plurality of frame plates or frame members 16 and a plurality of yoke plates or yoke members 18 which are alternately stacked in vertical arrangement on base member 12 and which are secured together against displacement by attachment means hereinafter described. Preferably the frame plates 16 are all of the same thickness and the yoke plates 18 are all of the same thickness but the yoke plates are substantially thicker than the frame plates.

Figure 2:
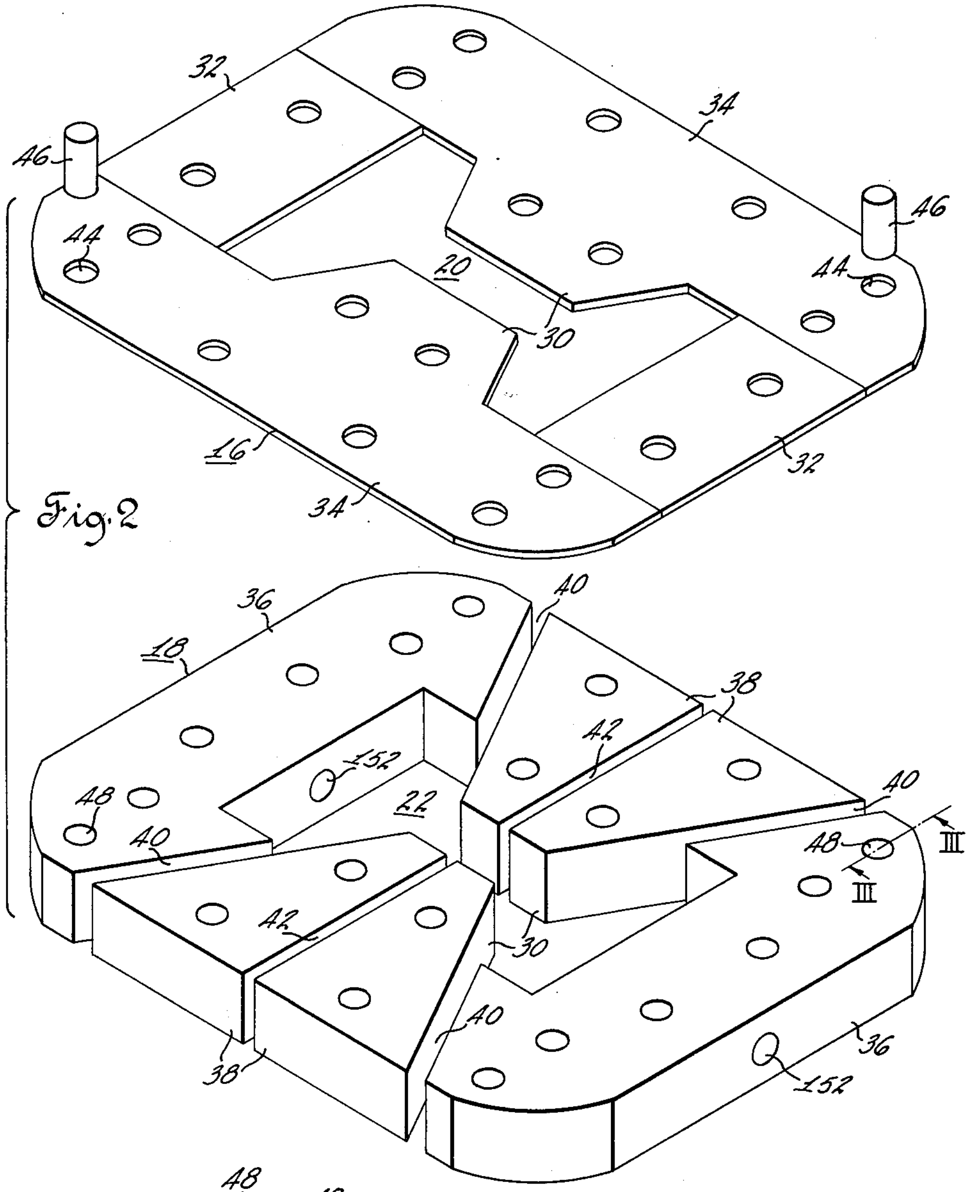
FIG. 2 is an exploded view showing the configuration and relationship of a typical frame member and yoke member which comprise the body portion of the generator shown in FIG. 1.

FIG. 2 discloses a typical frame plate 16 and yoke plate 18. Each frame plate 16 and each yoke plate 18 is provided with an H-shaped centrally disposed aperture 20 and 22, respectively. Thus, when the frame plates 16 and the yoke plates 18 are stacked, the apertures 20 and 22 therein align to define a passageway 24, shown in FIGS. 4 and 5, having an H-shaped cross sectional configuration which extends axially through body portion 10 of the generator. It is preferred that passageway 24 be tapered and this is accomplished by providing the frame plates 16 and the yoke plates 18 with apertures 20 and 22, respectively, which differ in size. Passageway 24 is adapted to accommodate a magnet coil 26, hereinafter described, and to accommodate insulating means and electrode means, hereinafter described, which define a flow channel 28, shown in FIGS. 1, 4, 5, 6, 7 and 8, for accommodating the flow of hot electrically conductive gases. As FIG. 2 shows, the apertures 20 and 22 in each frame plate 16 and each yoke plate 18, respectively, are constricted near the center thereof and, when the plates are stacked together, those portions of the frame plate and the yoke plate which form such constrictions align to provide elongated, oppositely disposed magnet poles 30 in body portion 10 of the generator.

Each frame plate 16 and each yoke plate 18 could be a unitary member but, preferably, for convenience in manufacture and assembly, each is fabricated of a plurality of pieces. Because tremendous magnetic forces act on body portion 10 of the generator when the latter is in operation, the pieces comprising the frame plates and yoke plates are shaped and arranged so as to be interlocked when secured together. Thus, as FIG. 2 shows, each frame plate 16 preferably comprises two rectangular end pieces 32 and two abutting side pieces 34. Each yoke plate 18 preferably comprises two C-shaped end pieces 36 and four wedge shaped side pieces 38.

The pieces comprising each yoke plate 18 are spaced apart from each other and define a set of six radiating gaps which communicate between central aperture 22 and two opposite exterior edges of the yoke plate. Each of the four gaps designated by the numeral 40 is adapted to accommodate an electrode chute, hereinafter described, and each of the two gaps designated by the numeral 42 is adapted to accommodate gas supply means and other members, hereinafter described. As will be understood, the sides of the gaps 40 and 42 in each individual yoke plate 18 are closed by two adjacent frame plates 16 when body portion 10 is assembled. It is to be further understood that while the angular arrangement of the set of four gaps 40 in the yoke plate 18 shown in FIG. 2 is typical, the angular arrangement of the four gaps 40 in each yoke plate differs, as comparison of FIGS. 6 and 8 make clear. This permits the set of electrode chutes accommodated by each yoke plate 18 to enter body portion 10 at a different angle with respect to a plane of symmetry 41, shown in FIGS. 6 and 7, in which the axis of passageway 24 lies.

Figure 3:
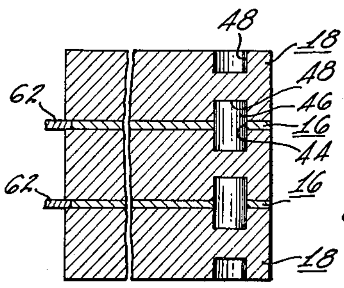
FIG. 3 is a cross sectional view of frame members and yoke members taken along line III—III in FIG. 2 showing how they are secured together by doweling.

Means are provided to secure the frame plates and the yoke plates and their constituent pieces together in proper alignment and to prevent their displacement. As FIGS. 2 and 3 show, the pieces comprising each frame plate 16 are provided with dowel holes 44 which extend completely therethrough and are adapted to accommodate dowels or members 46. The pieces comprising each yoke plate 18 are provided with registering dowel holes 48 which extend part way into the opposite faces thereof and are adapted to accommodate the ends of the dowels 46.

During assembly of body portion 10, the pieces comprising the lowest frame plate 16 are arranged on base member 12 of the generator and a first set of dowels 46 are placed in the dowel holes 44. Then, the pieces comprising the lowest adjacent yoke plate 18 are placed on the lowest frame plate 16 so that the dowel holes 48 in the underside of the yoke plate receive the appropriate dowels 46 Another set of dowels 46 are then placed in the dowel holes 48 in the upper side of the lowest yoke plate 18 and the pieces comprising the next adjacent frame plate 16 are put in place on the yoke plate. This stacking procedure is repeated until body portion 10 is completed. It is to be noted that each side piece 34 of a frame plate 16 is doweled to the two end pieces 36 and to two of the side pieces 38 of its adjacent yoke plate or plates 18. Thus, the constituent pieces of a yoke plate 18 are maintained in proper position with respect to each other. It is to be understood that the inner and outer edges of the frame plates and the yoke plates are provided with threaded holes where necessary to accommodate fastening devices such as bolts which are employed to secure various components to the exterior and interior sides of body portion 10.

*The generator magnet coil*

Figure 4:
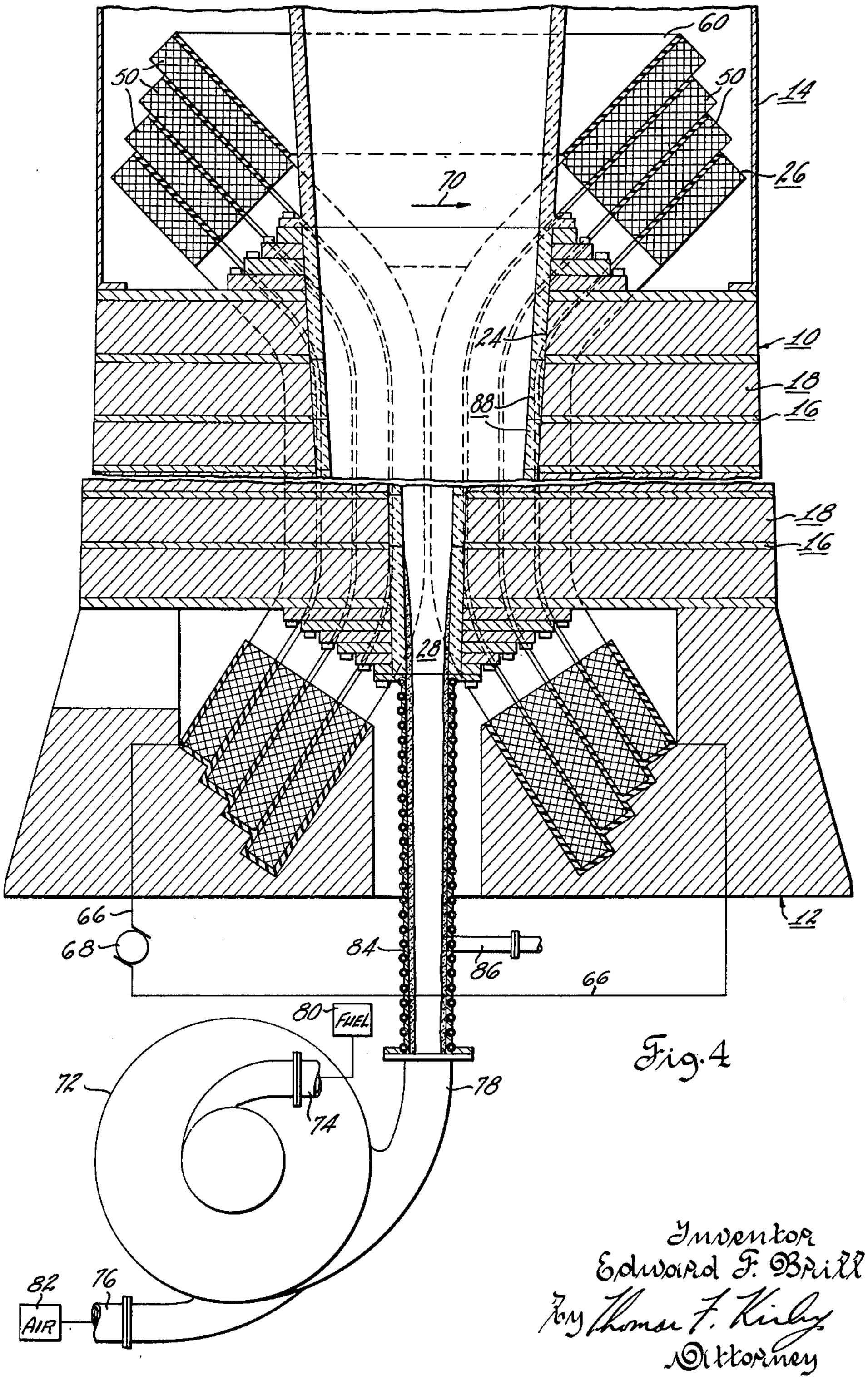
FIG. 4 is a cross sectional broken view of the generator taken along line IV—IV of FIG. 1 and an elevational view of a cyclone furnace associated therewith.
Figure 5:
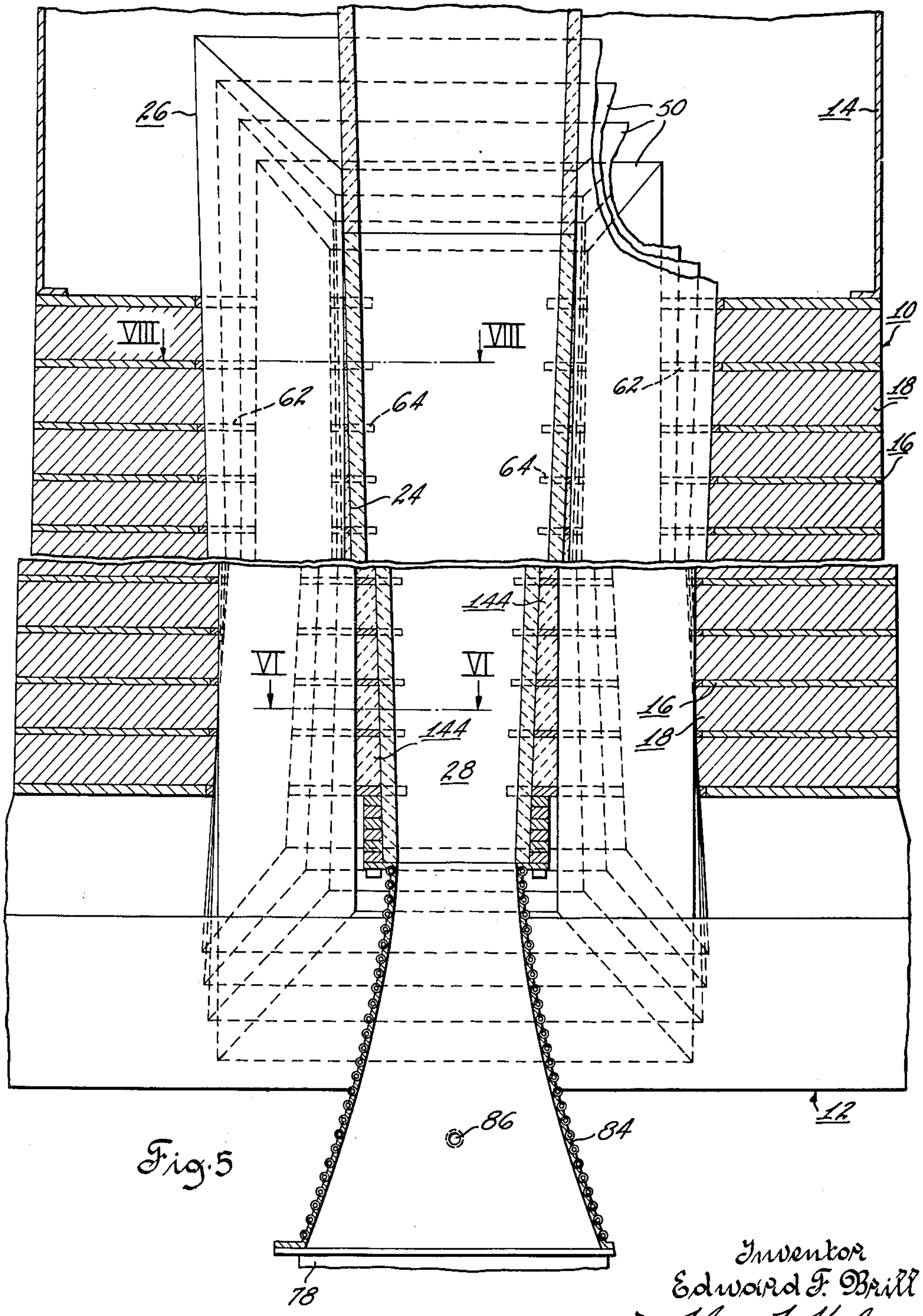
FIG. 5 is a cross sectional broken view of the generator taken along line V—V of FIG. 1.
Figure 6:
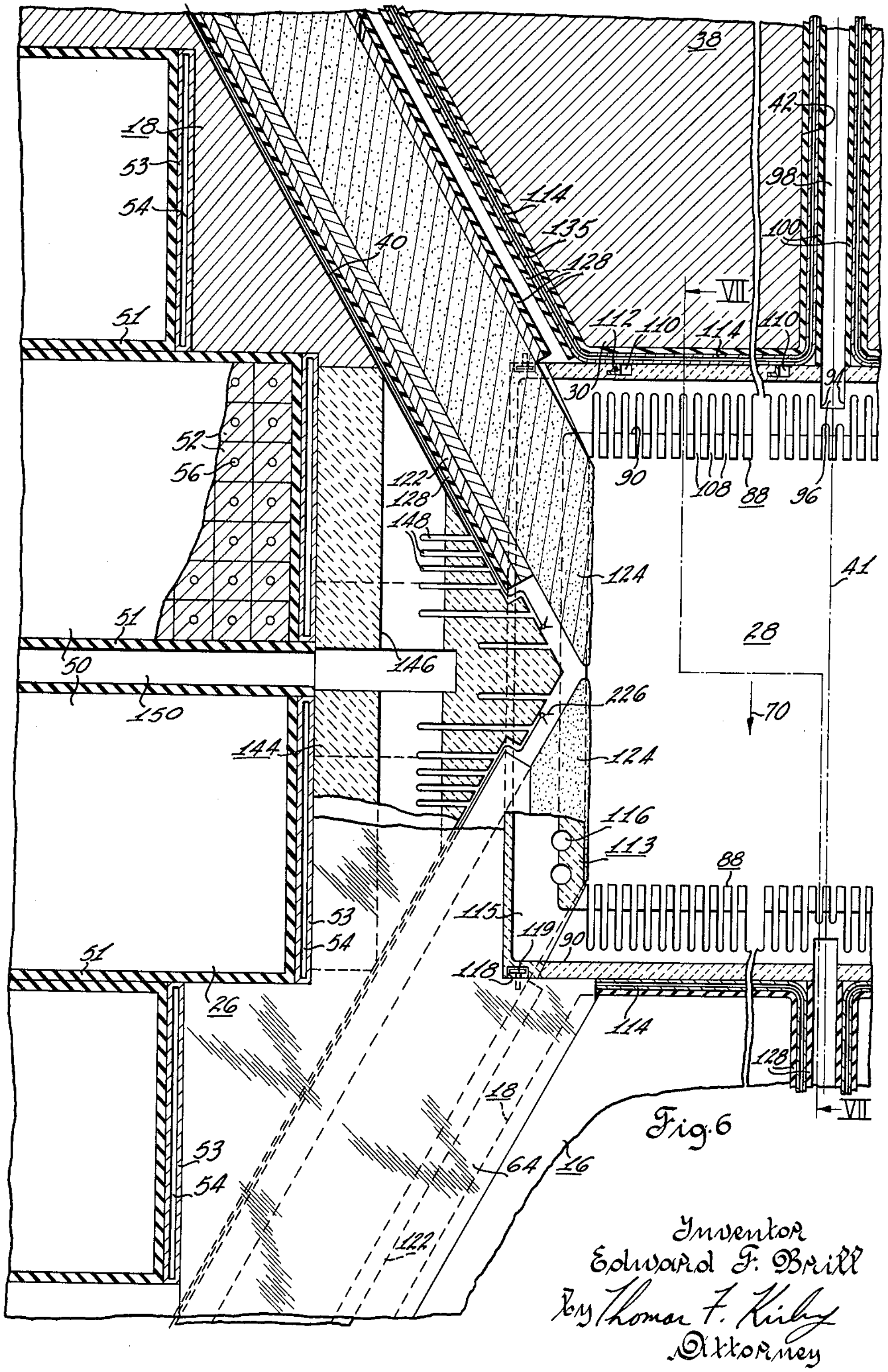
FIG. 6 is an enlarged cross sectional view of the generator taken along line VI—VI of FIG. 5.
Figures 8, 10:
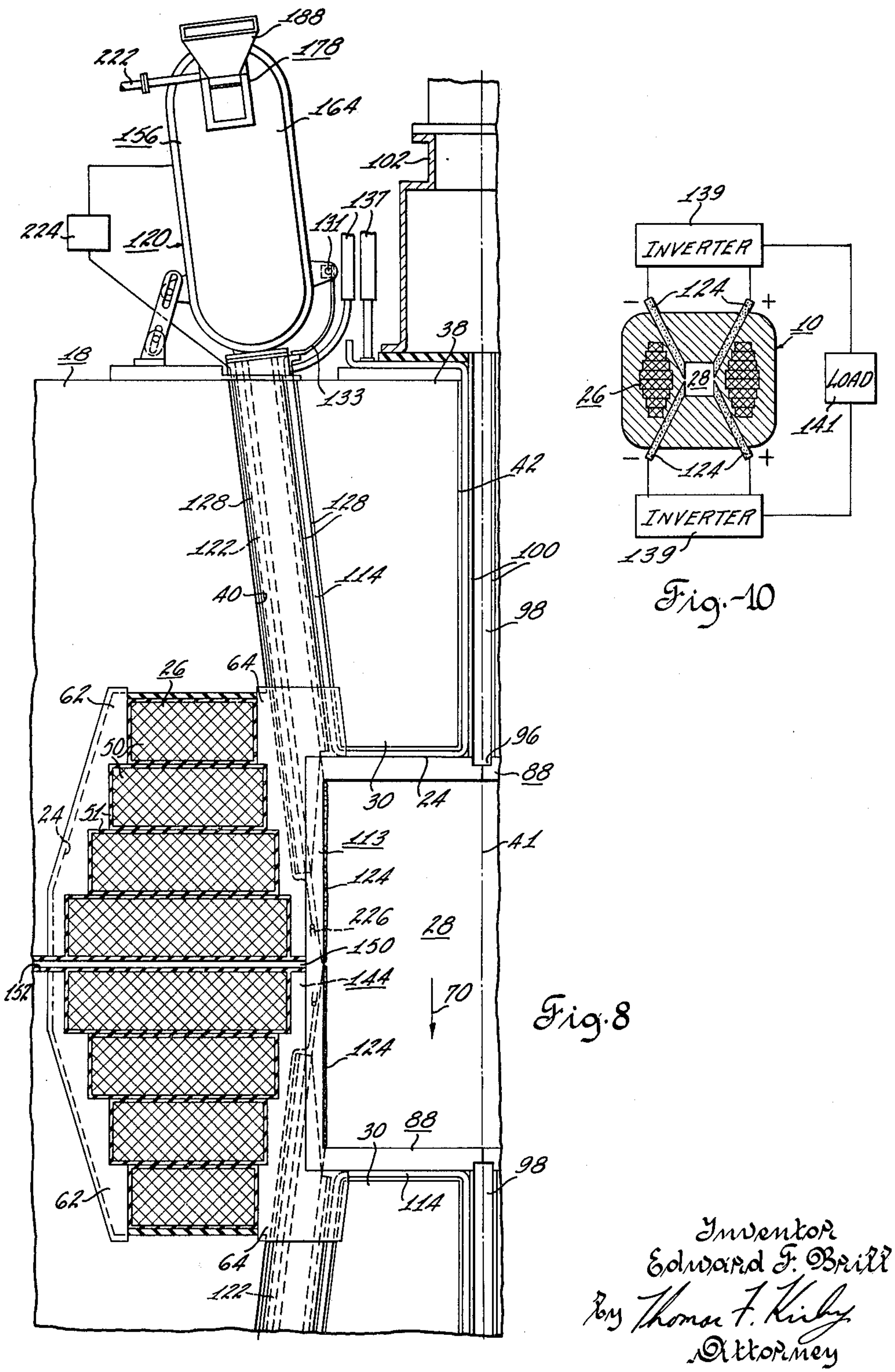
FIG. 8 is a view of the generator, partly in section and partly in elevation, taken along the line VIII—VIII of FIG. 5 and showing portions of electrode means and air intake means on the exterior of the body portion of the generator.
FIG. 10 is a diagrammatic view showing the manner in which a set of electrodes is electrically connected to a load device through inverters.

FIGS. 1, 4, 5, 6 and 8 show magnet coil 26 which is the magnetic flux producing means for the generator. Magnet coil 26 is mechanically supported by base member 12 and by body portion 10 and is arranged within passageway 24 in the body portion so as to surround the magnet poles 30. Disposition of magnet coil 26 within steel body portion 10 reduces the reluctance of the magnetic circuit and concentrates the magnetic field in the narrow space in passageway 24 between the magnet poles 30. For convenience, magnet coil 26 is preferably fabricated of a number of smaller coil units 50 which are understood to be electrically interconnected, preferably in series. In the embodiment shown, magnet coil 26 comprises eight substantially rectangular coil units 50 which are insulated from each other by insulating means 51, as FIG. 6 shows, and each coil unit comprises a plurality of insulated conductors 52, shown in FIG. 6. Each conductor 52 is provided with a cooling passage 56 to accommodate the flow of a cooling fluid such as water for reducing the operating temperature of magnet coil 26. The coil units 50 are all of the same thickness but, as FIGS. 5, 6 and 8 show, differ in width and are disposed in staggered relationship in order to adapt to the shape of tapered passageway 24 and to afford clearance for slanted electrode chutes, hereinafter described, which extend into the passageway. FIG. 6 shows that the edge of each coil unit 50 facing a flow channel, hereinafter described, in passageway 24 is provided with protective or shielding means, such as a fluid cooled metal liner 53 having a cooling passage 54 therein, to protect the coil unit from damage due to intense heat radiation which may leak past the other components that are arranged between magnet coil 26 and the flow channel in passageway 24. As FIGS. 1 and 4 make clear, the ends of the coil units 50 are bent outwardly away from the center line of body portion 10 of the generator to afford clearance at each end of passageway 24; the lower ends of the coil units being maintained in this position by base 12 and the upper ends by spreader means 60.

The weight of magnet coil 26 is principally supported directly on base member 12 but, as FIGS. 5, 6 and 8 show, blocking or supporting means are provided, preferably at each frame plate 16, to rigidly secure coil units 51 against displacement within passageway 24 of body portion 10. Preferably, the blocking or supporting means are fabricated of nonmagnetic material so as not to interfere with or adversely affect the desired magnetic circuit of the generator. FIGS. 5 and 8 show that the blocking or supporting means at each frame plate 16 comprise a member 62 which is located in passageway 24 between the inner edge of end piece 32 of the frame plate and the outer side of magnet coil 26. FIGS. 5, 6 and 8 show that the blocking or supporting means at each frame plate 16 further comprise a member 64 which is located in passageway 24 between the inner side of magnet coil 26 and the edge of side piece 34 of the frame plate. Because the blocking members 62 are relatively remote from flow channel 28 and are not exposed to extremely high temperatures, it is preferable to fabricate them of low cost, nonmagnetic insulating material such as wood, Bakelite or the like. Because the blocking members 64 are relatively close to flow channel 28 and are exposed to extremely high temperatures, it is preferable to fabricate them of nonmagnetic heat resistant material such as aluminum or stainless steel.

FIG. 3 shows that each blocking member 62 is secured in position by having its edge sandwiched between the pair of yoke plates 18 adjacent each frame plate 16. It is to be further understood, as shown in FIG. 6, that each blocking member 64 is similarly secured in position by having a portion of its edge sandwiched between a pair of yoke plates 18 adjacent each frame plate 16.

As FIG. 4 shows, magnet coil 26 is provided with means such as the conductors 66 which adapt it for connection to a source 68 of electrical power, such as a D.C. generator or the like. It may be assumed, for example, that curent flow through magnet coil 26 is in such a direction that a magnetic field is provided transversely through passageway 24 in the direction of the arrow 70 shown in FIGS. 4, 6, 7 and 8.

*Gas supply means for flow channel*

As FIGS. 1, 4, 5, 6, 7, 8 and 9 show, passageway 24 in body portion 10 of the generator is adapted to accommodate means, hereinafter described, which cooperate to define heat resistant, thermally insulated, pressurized flow channel 28, hereinbefore referred to, through which hot, electrically conductive gases flow.

The means for supplying such gases to flow channel 28 comprises a cyclone furnace 72, shown in FIG. 4, which is located below base 12 of the generator. Cyclone furnace 72 has a fuel inlet 74, a combustion air inlet 76, and a gas outlet 78. Fuel inlet 74 is adapted for connection to a source 80 of fuel such as crushed coal or the like; crushed coal being preferred because it supports the high temperatures necessary, is readily available, is relatively economical, and naturally contains potassium compounds which are extractable from the ash thereof for subsequent use as seeding materials in operation of the generator. Combustion air inlet 76 is adapted for connection to a source 82 of pressurized air, such as an air compressor which is understood to be part of the overall plant. Gas outlet 78 is adapted for connection to the wider end of a water cooled nozzle 84, shown in FIGS. 4 and 5, which has its narrower end connected to the narrow inlet end of flow channel 28. Nozzle 84 is provided with an inlet port 86 through which seeding materials, such as the potassium compounds hereinbefore referred to, are introduced into the hot gas stream to render it sufficiently ionized to produce the desired effect. The fuel and air are burned together in cyclone furnace 72 to produce combustion gases which have a temperature in excess of 5050° F. and which, after passing through nozzle 84, enter flow channel 28 at a subsonic velocity of about 800 meters per second. It is preferred that flow channel 28 be tapered so as to maintain the gases at substantially constant velocity therethrough. Furthermore, it is preferred that flow channel 28 have a rectangular, nearly square, cross sectional configuration to minimize the surface area thereof and thus reduce heat losses.

*Flow channel insulation means*

Figure 7:
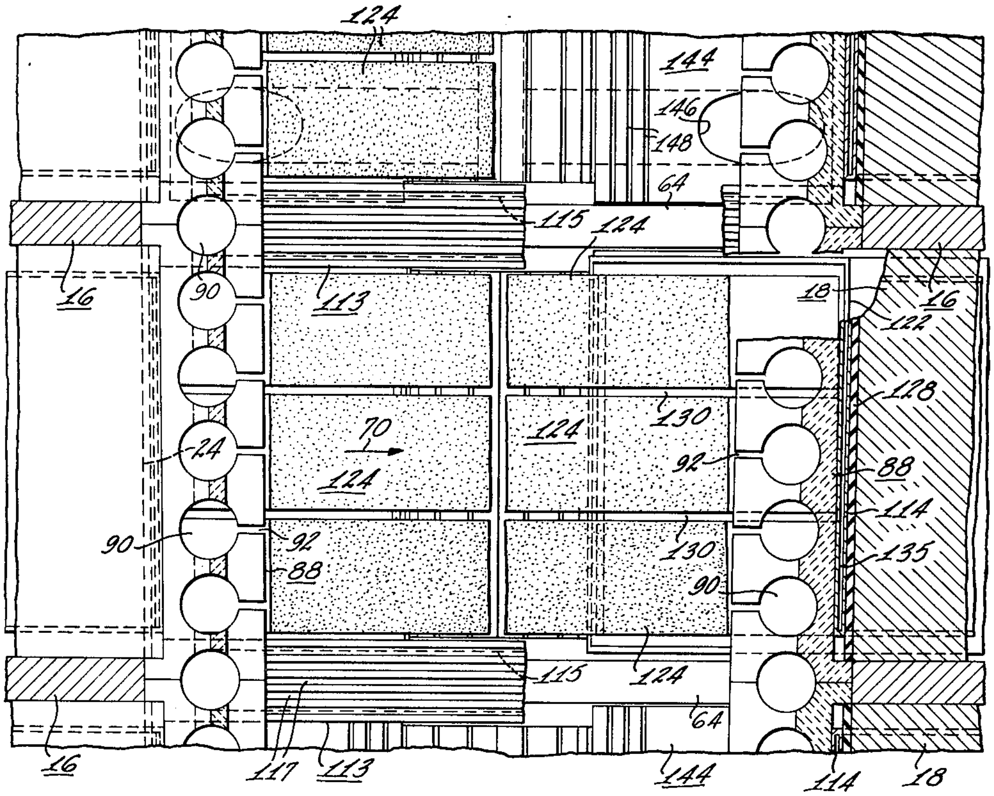
FIG. 7 is a view of the generator, partly in section and partly in elevation, taken along staggered line VII–VII of FIG. 6.

As FIGS. 4, 6, 7, 8 and 9 show, two opposite sides of flow channel 28 are defined by insulating means which are adapted to confine hot gases within the flow channel and to electrically insulate between the electrode means, hereinafter described, which substantially define the other two opposite sides of the flow channel. The aforesaid insulating means are further adapted to inhibit heat loss from flow channel 28. In keeping with the modular construction of the generator, the insulating means take the form of a plurality of individually replaceable modular insulating blocks or members 88 which are arranged in two rows along the face of each pole 30. FIGS. 4 and 7 show that each block 88 is as long as the distance between the center lines of two successive frame plates 16 of body portion 10. If preferred, however, some other modular length could be employed. FIGS. 6 and 8 show that each block 88 is approximately one-half as wide as flow channel 28, i.e., slightly wider than the inner or narrow end of one of the side pieces 38 of its associated yoke plate 18. The blocks 88 are adapted to withstand prolonged exposure to the extremely high temperature, high velocity gases in flow channel 28. Thus, the blocks 88 are fabricated of heat resistant, electrical insulating material such as magnesium oxide, thorium oxide, beryllium oxide or the like. Fully oxidized materials are preferred so that further oxidation and attendant decomposition do not occur when the blocks are exposed to the hot oxidizing atmosphere in flow channel 28. While the aforesaid materials have good resistance to mechanical breakdown at the high temperatures involved, they tend to become electrically conductive at such temperatures. Accordingly, it is desirable both to cool the blocks 88 and to prevent their direct contact with the hot gases in flow channel 28 and means are provided for these purposes.

Figure 9:
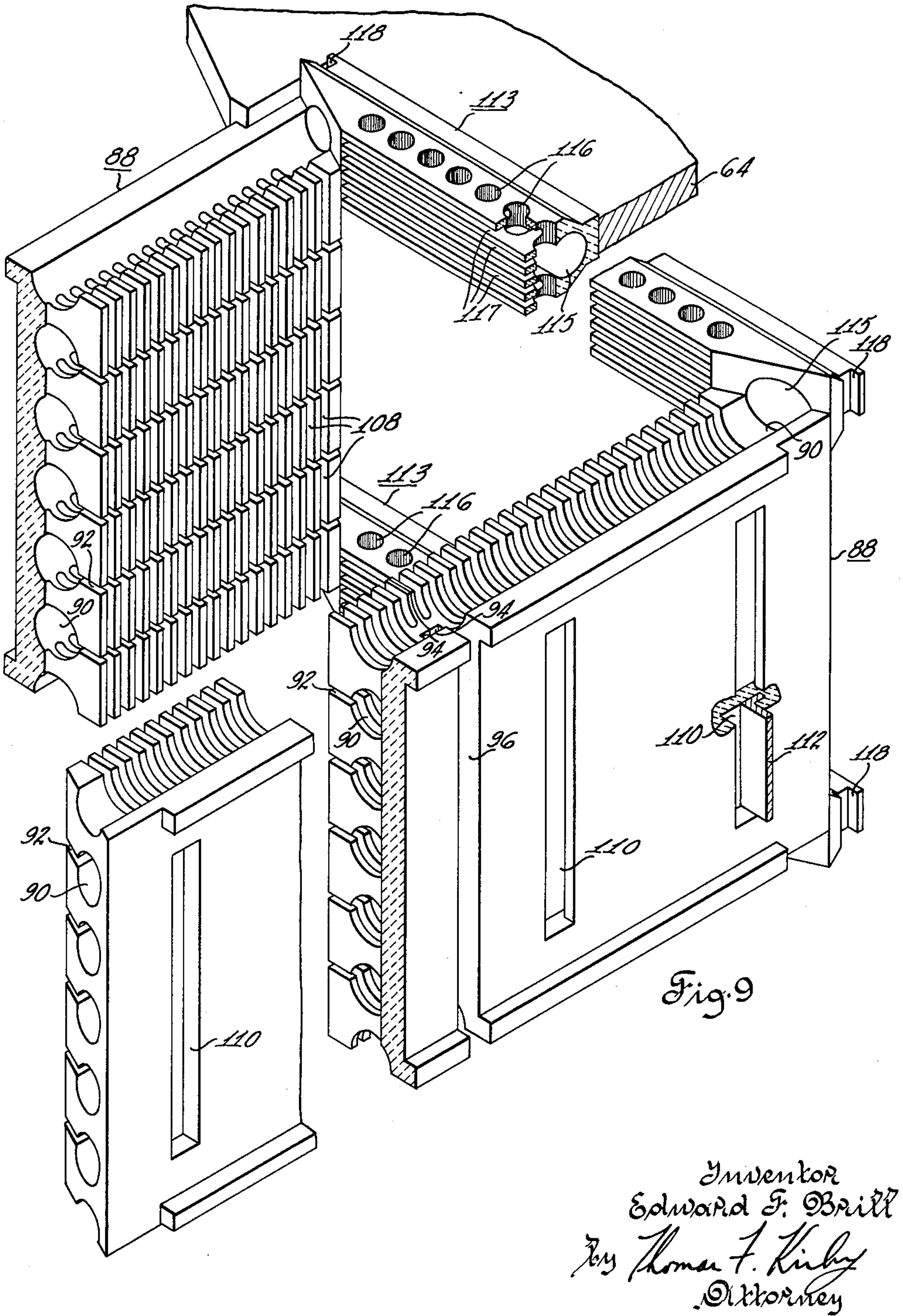
FIG. 9 is an isometric view of a portion of the insulating means employed in the passageway in the body portion of the generator to define the flow channel.

Thus, as FIGS. 6, 7 and 9 show, each block 88 is provided with a plurality of passages 90 and each passage communicates with flow channel 28 through a plurality of apertures or louvers 92 which are provided in the face of each block. The passages 90 and the louvers 92 in each block 88 are adapted to accommodate the flow of pressurized electrically nonconductive gas, such as compressed air or flue gas, which enters flow channel 28 through the louvers to provide a film or layer of gas along the surface of the block facing the flow channel. This film of gas prevents the hot electrically conductive gases in flow channel 28 from directly contacting the surface of a block 88 and in addition tends to cool the block. Thus, the block 88 retains its normal electrical insulating properties and is not directly exposed to the destructive action of the hot, high velocity gases in flow channel 28. If air is the electrically nonconductive gas employed, such air entering flow channel 28 in the foregoing manner subsequently serves as secondary combustion air for the combustion process occurring therein.

As FIGS. 6, 8 and 9 show, each block 88 is provided on the rear side thereof along its innermost edge with a recess 94 which intersects with each passage 90 in the block. Thus, when two blocks are mounted in passageway 24 in body portion 10 in side-by-side position with their innermost edges juxtaposed, the recesses 94 cooperate to define a gas inlet port 96 for the passages 90 in the two blocks. As FIGS. 6 and 8 show, each gas inlet port 96 communicates with a gas supply channel 98 which is defined by insulating members 100 disposed in a gap 42 in the yoke plate 18 with which the two blocks are associated.

As FIG. 8 shows, each gas supply channel 98 communicates with a gas duct housing 102 which is supported on the exterior of body portion 10 of the generator. As FIG. 1 shows, two separate gas duct housings 102 are provided on one exterior side of body portion 10 and it is to be understood that two similar housings are provided on the opposite side of the body portion. Each gas duct housing 102 is adapted for connection to a source of pressurized nonconductive gas, such as an air compressor 106 which is understood to be part of the power plant in which the generator is employed. Separate gas duct housings are preferred in the embodiment shown so that each may be supplied with gas or air at different pressures. However, it is to be understood that the two separate duct housings on a side could be formed as a unitary member and supplied from the same source of gas or air.

In addition to the louvers 92 which cross the face of each block 88, each block is provided with a plurality of slots 108 which are disposed so as to run in the same direction as the axis of flow channel 28. The slots 108 provide a serrated surface on each block 88 and tend to reduce short circuiting which might occur in flow channel 28 between electrodes on opposite sides of the flow channel.

As FIGS. 6 and 9 show, each block 88 is provided with means which adapt it to be secured in position. Such means take the form of two L-shaped slots 110 which are provided at the rear of each block and which are adapted to engage L-shaped metal brackets 112 which are rigidly secured as by welding to an electrical conductor 114, hereinafter described. To secure block 88 in position, it is first placed so that its slots 110 register with the brackets 112 and then it is slid sideways so that a shoulder in each slot engages a leg of each bracket.

In addition to the insulating blocks 88 which line the aforesaid two opposite sides of flow channel 28, similar insulating members are provided at intervals along the other two opposite sides of the flow channel defined by the electrodes hereinafter described.

As FIGS. 6, 7, 8 and 9 show, an insulating member 113 is provided for disposition between the exposed portions of each pair of electrodes of the same polarity to complete the aforesaid other two opposite sides of flow channel 28. It is to be understood that each insulating member 113 is fabricated of the same material as the insulating blocks 88 hereinbefore described. Furthermore, each insulating member 113 is provdied with an internal passage 115 which intersects with a plurality of smaller transversely disposed passages 116 and the latter communicate with louvers 117 which are provided in the face of each insulating member. When in place in passageway 24, each insulating member 113 mates with two associated insulating blocks 88 so that one of the internal passages 90 in each of the latter aligns with internal passage 115. Thus, pressurized gas from passage 90 is supplied to the passage 115 in each insulating member 113 and is expelled through the louvers 117 in the latter to effect cooling of the latter.

As FIGS. 6 and 9 show, each insulating member 113 is provided at each end with a slot 118 which is adapted to engage a bracket 119 which is rigidly attached as by welding to the blocking member 64. As will be understood, during assembly of the generator each insulating member 113 is placed in position subsequent to the positioning of blocks 88 with which it is associated but prior to the positioning of the electrode chutes 122.

*Flow channel electrode means*

As FIGS. 1, 6, 7, 8, 10, 11 and 12 show, the generator comprises electrode means for collecting electrical power generated by the hot electrically conductive gases as they move through the magnetic field in flow channel 28. Rather than provide one continuous electrode along each of the two opposite sides of flow channel 28, it is preferred to provide a plurality of individual electrodes 124, hereinafter described, which are arranged in two rows on each of the two opposite sides of the flow channel. Provision of a plurality of electrodes and division of each into several distinct masses, as hereinafter described, tends to reduce eddy currents in the electrodes and also tends to reduce Hall effects in flow channel 28. The electrode means comprise a plurality of substantially identical electrode units 120, such as that shown in FIG. 8, which are arranged in two rows on two opposite sides of body portion 10 and which are mechanically supported thereby. As will be understood, each yoke plate 18 has a set of four complete electrode units 120 associated therewith in a radial arrangement.

The generator disclosed herein is adapted to produce D.C. electrical power and, as FIG. 10 makes clear, the electrodes 124 along one side of flow channel 28 are understood to be electrically negative and those along the other side are electrically positive. As FIGS. 6, 7, 8, 10 and 12 show, each electrode unit 120 comprises an electrode chute or box 122 which is disposed in a gap 40 in a yoke plate 18. One end of each electrode chute 122 extends outside of body portion 10 of the generator and the other end projects into passageway 24 between one side of magnet coil 26 and flow channel 28. Each electrode chute 122 is adapted to have electrically conductive consumable material in particulate form, such as crushed coal or the like, supplied thereto, compacted therein, and forced therethrough to provide a consumable electrode 124 having an exposed portion which confronts a side of flow channel 28. Preferably, seeding material in the form of potassium compounds is mixed with the crushed coal which is supplied to the electrode chutes 122. Due to the intense heat in flow channel 28, the compacted coal near the inner end of each electrode chute 122 is converted to coke. As FIGS. 6, 7 and 8 make clear, the exposed portions of the consumable electrodes 124 which are arranged in two rows along two opposite sides of flow channel 28 substantially define wall surfaces which are ablatable and are thus able to withstand prolonged exposures to the hot, high velocity gases in the flow channel. For purposes of discussion herein, the term "ablatable" is used to describe the tendency of the material forming a consumable electrode to burn, melt, evaporate, sublimate, erode away, or otherwise be consumed when exposed to the high velocity flow of extremely hot gases in flow channel 28. Each electrode chute 122 is fabricated of abrasive-resistant, nonmagnetic materail such as stainless steel or the like. In order to insure that the crushed coal which is forced therethrough is firmly compacted, each electrode chute 122 is tapered and, in addition, is provided on the interior thereof with two dividers or walls 130, shown in FIGS. 7, 11 and 12. The dividers 130 also cause the extruded end of each consumable electrode 124 to be divided into three distinct masses. Such division of the electrode surfaces results in a reduction in eddy currents in the electrode surfaces.

Since it is desired that flow channel 28 be tapered, it is necessary that the exposed portions of the consumable electrodes 124, which are arranged along and define two sides thereof, vary in surface area in order to afford a fairly complete ablatable wall surface at all positions along the flow channel. Accordingly, each set of four electrode chutes 122 associated with a particular yoke plate 18 has a different angular disposition with respect to plane of symmetry 41, as comparison of FIGS. 6 and 8 makes clear. Furthermore, the inner end of each electrode chute 122 terminates in a plane which is substantially parallel to the boundary edge of one side of flow channel 28. This arrangement results in the necessary amount of electrode surface area being exposed at various electrode positions.

As FIGS. 1, 6, 7 and 8 show, each electrode chute 122 is provided with means for making an electrical connection thereto and such means take the form of an electrical conductor 114 which lies alongside the electrode chute in gap 40 extends across the face of the adjacent magnet pole 30 (i.e. across the narrower end of one side piece 38 of the associated yoke plate 18) and is led out through gap 42 in the associated yoke plate 18. As FIG. 8 shows, one end of electrical conductor 114 is connected to an electrical terminal 131 by means of a conductor 133. The other end of electrical conductor 114 is itself adapted to serve as an electrical terminal. With the foregoing arrangement, it is possible to make a direct electrical connection to a consumable electrode 124 in its electrode chute 122 directly through electrical terminal 131. If preferred, however, an electrical connection can be made to the aforesaid other end of electrical conductor 114. With this latter arrangement, current flows through electrical conductor 114 in a direction opposite to that of the current flow in the gases in flow channel 28. This provides a compensating magnetic field around electrical conductor 114 which cancels out or compensates for the effects of variations in load currents on the excitation of the generator.

As FIGS. 6, 7 and 8 show, each electrode chute 122 and its associated electrical conductor 114 is provided with insulating means, such as the heat resistant insulating members 128 which prevent them from making electrical contact with their associated yoke plate 18.

Each electrical conductor 114 is provided with a passage 135 therein for accommodating the flow of a cooling fluid such as water or other suitable liquids or gases and connections 137, therefor shown in FIG. 8, are provided on each conductor.

As will be understood, the electrodes 124 of the generator could be directly connected to a load to supply D.C. power thereto. However, it may be desirable to convert D.C. power to A.C. power before supplying it to a load and such an arrangement is shown in FIG. 10. To reduce Hall effects which may occur along the length of the generator, it is preferable to connect each pair of electrodes 124 of opposite polarity in each set to individual inverter units 139 and to then connect the individual inverter units to a common load device 141, as shown in FIG. 10.

As FIGS. 6, 7 and 8 show, an insulating member 144 is located behind each pair of electrode chutes 122 to afford further thermal insulation for flow channel 28 and to serve as an inlet for a cooling gas such as air which is directed against the rear of each pair of electrode chutes. Each insulating member 144, which is preferably fabricated of the same material as the blocks 88 and the insulating members 132 hereinbefore described, is provided with an internal passage 146 which communicates with a plurality of slots 148. The internal passage 146 in member 144 is adapted for connection to a gas inlet 150 which extends between the two adjacent center coil units 50 of magnet coil 26 and through a hole 152 in yoke plate 18 with which the two electrode chutes 122 are associated. As FIG. 1 shows, pressurized gas from a source 154 such as an air compressor located exterior of the generator is supplied to gas inlet 150 in hole 152 and after passing through passage 146 in insulating member 144 and slots 148, enters flow channel 28.

The electrode chutes 122 and the consumable electrodes 124 therein, the insulating members 132, the insulating members 144, the blocking members 64 and the jackets 54 cooperate to insulate magnet coil 26 from exposure to the heat in flow channel 28 and inhibit heat loss from the flow channel.

*Electrode feeder means*

Figures 11, 12, 13:
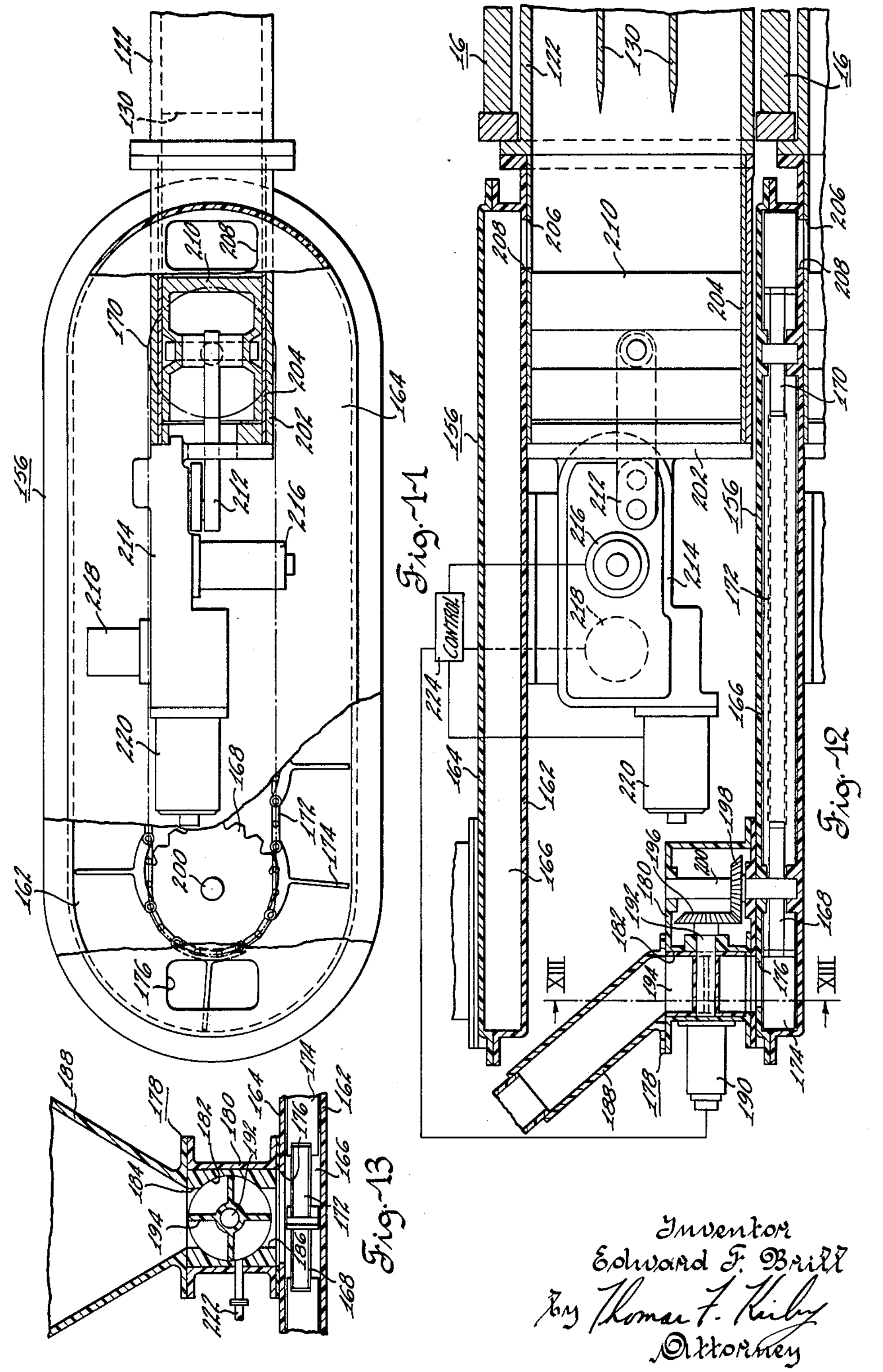
FIG. 11 is an enlarged detail view of the interior of the electrode means shown in FIG. 8.
FIG. 12 is a side elevational view of the electrode means of the type shown in FIG. 11
FIG. 13 is a sectional view taken along line XIII—XIII of FIG. 12.

Means for supplying crushed coal to the electrode chutes 122 are shown in FIGS. 1, 8, 11, 12 and 13. Since each electrode chute 122 and the consumable electrode 124 therein are electrically conductive, it is necessary to make provision to electrically insulate them from the other apparatus making up the associated electrode unit 120, hereinafter described, which is associated therewith and from the common supply of crushed coal. As FIGS. 8, 11 and 12 show, the exterior end of each electrode chute 122 is adapted for connection to a feeder unit 156 which is rigidly mounted on the outside of a body portion 10 of the generator. It is to be understood that all the feeder units 156 are identical and are individually removable. FIGS. 1 and 12 make clear that the feeder units 156 are aligned in two rows on two opposite sides of the exterior of body portion 10 and that each row is enclosed by a coal chute or cover member 158 which is attached to body portion 10 and fabricated of electrical insulating material such as fiber glass or the like. As FIG. 1 shows, each coal chute 158 is provided at its uppermost end with an aperture 160 which is adapted for connection to a source of crushed coal.

Each feeder unit 156 comprises a pan member 162 and a cover member 164 which are fabricated of insulating material such as fiber glass and are rigidly secured together to provide a chamber 166. Chamber 166 contains two sprocket wheels 168 and 170 which drive a coal transfer chain 172 which has a plurality of coal moving vanes 174 thereon. The cover member 164 of feeder unit 156 is provided with a coal inlet port 176 over which a coal input unit 178, best seen in FIGS. 8, 12 and 13, is located. Input unit 178 comprises a nonconductive housing 180 having a cylindrical chamber 182 therein which is provided with an inlet opening 184 and an outlet opening 186 which register with coal inlet port 176 in input unit 178. A coal hopper 188, fabricated of nonconductive material such as fiber glass, is secured to housing 180 of input unit 178 over inlet opening 184. Input unit 178 is provided with an electric motor 190 for driving a shaft 192 to which a bladed electrically nonconductive star wheel 194 located in cylindrical chamber 182 is rigidly attached. Nonconductive housing 180 of input unit 178 and its nonconductive star wheel 194 serve as an electrical insulating barrier or means of separation between the crushed coal in coal chute 158 and the crushed coal in feeder unit 156. In this way, the consumable electrode 124 in each electrode chute 122 is electrically isolated from the common supply of crushed coal to prevent electrode short circuiting. As FIG. 12 shows, shaft 192 is also provided with a bevel gear 196 which drives another bevel gear 198 on a shaft 200 which drives sprocket wheel 168 in chamber 166 of feeder unit 156.

Pan member 162 of feeder unit 156 is provided on its exterior side with an integrally formed compacting cylinder 202 which has a steel cylinder lining 204 therein. Compacting cylinder 202 is in axial alignment with its associated electrode chute 122. Cylinder lining 204 has an opening 206 which registers with a coal outlet port 208 in pan member 162. Cylinder lining 204 accommodates a coal packing piston 210, preferably fabricated of steel, which is connected by an insulated connecting rod linkage 212 to the interior driving mechanism of a driving unit 214. Driving unit 214 is provided with a drive motor 216 for driving the piston slowly during its forward stroke when it is forcing ground coal into and through electrode box 122. Driving unit 214 also is provided with a clutch mechanism 218 for effecting disengagement of drive motor 216 during the return stroke of piston 210. Driving unit 214 is further provided with another motor 220 for effecting a quick return stroke of piston 210 while drive motor 216 is disengaged. The motors 190, 216, and 220 and clutch mechanism 218 are understood to be in normally "off" or inoperative conditions.

In operation, crushed coal is supplied to the coal chutes 158 and enters hopper 188 of each feeder unit 156. The rotating star wheel 194 moves the coal from the hopper 156 through the chamber 182 into chamber 166 of feeder unit 156. The vanes 174 on transformer chain 172, which is driven by motor 190, move the coal through chamber 166 from inlet port 176 to outlet port 208 where it is ready to enter compacting cylinder 202. When piston 210 is in the return position, the coal enters compacting cylinder 202 and is gradually forced by the piston into electrode chute 122.

Due to the fact that the pressure within flow channel 28 in the generator is several times above atmospheric pressure, means must be provided to prevent the electrode material in each electrode chute 122 from being blown back up. Furthermore, it is desirable that the gases formed as each electrode 124 cokes be forced from each electrode chute 122 into flow channel 28 for combustion therein. Accordingly, it is to be noted that a gastight path exists from the cylindrical chamber 182 of each input unit 178, through chamber 166 in feeder unit 156, through compacting cylinder 202, and through electrode chute 122. A vent tube 222, shown in FIGS. 8 and 13, is understood to communicate between cylindrical chamber 182 of input unit 178 and air inlet 150 for insulating member 144 to insure that no pressure differential exists between chamber 182 and flow channel 28.

During operation of the generator, the coked portion of each consumable electrode 124 extending from the inner end of its respective electrode chute 122 burns, melts, ablates and erodes away at an average rate, for example, of about one inch per minute but variations occur. If the consumable electrodes 122 burn too short, the intense heat in flow channel 28 can damage the electrode chutes 122 and other components along the sides of the flow channel. Furthermore, the voltage across a pair of oppositely disposed electrodes in an MHD generator depends, other factors being constant, on the distance between such electrodes. More particularly, increasing the distance between opposed electrodes increases the voltage thereacross and decreasing the distance decreases the voltage. Accordingly, the means for supplying coal to each electrode chute 122 are adapted to operate when necessary to insure that the proper amount of consumable electrode projects from the electrode chute.

Means are provided to control and regulate the coal feed to each electrode chute 122. Thus, as FIGS. 8 and 12 show, the motors 190, 216 and 220 and clutch mechanism 218 on each coal feed unit 120 are connected to a control unit 224 which regulates the operation thereof in accordance with a control signal received from a condition responsive device 226 located within flow channel 28. As FIGS. 6 and 8 show, condition responsive device 226, which for example is understood to be a thermally responsive device such as a thermocouple, is preferably located behind the exposed portion of its associated consumable electrode 122 so as to be subjected to variations in temperature depending upon the amount of consumable material extending from the end of its associated electrode chute 124. Thus, if an individual electrode 122 burns too short, its associated thermocouple experiences an increase in temperature and effects, through control unit 224, operation of motors 190, 216 and 220 and clutch mechanism 218 for that particular electrode and effects an increase in the amount of coal being supplied to its associated electrode chute 122. Conversely, when the projecting portion of the consumable electrode is restored, the associated thermocouple experiences a decrease in temperature and effects stoppage of motors 190, 216, 220 and clutch mechanism 218 and a reduction in the amount of coal being supplied to the electrode chute.

*Operation*

The generator operates in the following manner. Magnet coil 26 is energized from D.C. source 68 and a magnectic field is established transversely through flow channel 28 in the direction of arrow 70.

Pressurized air from the air compressors 106 is supplied to the air duct housings 102 and from thence through the air supply channel 98 to the internal passages 90 in the insulating blocks 88. Some of the air supplied to the passages 90 in the blocks 88 is expelled through the louvers 92 in the blocks 88 to provide a film of air along the surfaces of the latter and some of the air from the passages 90 in the blocks 88 is supplied to the internal passages 134 in the insulating members 132 for expulsion through the louvers 138 to provide a film of air along the surfaces of the latter insulating members.

Additional pressurized air from air compressor 154 is supplied through the air inlets 150 to the air passages 146 in the insulating members 144 behind the electrodes 124 for expulsion through the slots 148 in the insulating members 144 to cool the electrodes.

Pressurized preheated air from air compressor 82 and crushed coal from source 80 are supplied to cyclone furnace 72 wherein combustion occurs and hot combustion gases from the cyclone furnace pass through nozzle 84 into flow channel 28 of the generator. Seeding material is introduced into the hot combustion gases through inlet port 86 in nozzle 84.

As the hot seeded ionized combustion gases move at high velocity through the magnetic field in flow channel 28, D.C. electrical current is generated in the gas stream and an electrical potential is established between opposite pairs of consumable electrodes 124 which line the flow channel. Thus, as regards each pair of electrodes, electrical current flows from one consumable electrode 124, through its associated electrode chute 122, through the conductor member 114 associated with the latter, through inverter 139, through the conductor member 114 associated with the other electrode chute 122 comprising a pair, and through that electrode chute 122 to its associated consumable electrode 124. Inverted current from inverter 139 is then supplied to load 141.

As explained hereinbefore, the hot gases flowing through flow channel 28 are prevented from making direct contact with the blocks 88, the insulating members 132 and the insulating members 144 by the films of air which are provided on the surfaces thereof which confront the flow channel. In addition, the air thus introduced into flow channel 28 serves as secondary combustion air for the hot gases in the flow channel.

The hot gases moving through flow channel 28 do, however, act on the exposed portions of the consumable electrodes 124 and effect burning, ablation and erosion thereof. Consumption of the electrodes 124 in this manner contributes somewhat to the supply of hot gases in flow channel 28 and the secondary combustion air, referred to above, insures complete combustion.

As noted hereinbefore, the motors 190, 216, 220 and clutch mechanism 218 of each electrode feeder unit 156 are normally deenergized. However, if an individual electrode 122 burns too short, its associated thermocouple 226 experiences an increase in temperature and effects operation of motors 190, 216, 218 and 220 of that particular feeder unit 156. Thus, when motor 190 is energized, crushed coal which is on hand in the coal chutes 158 and in hopper 188 of each feeder unit 156 is moved by insulated star wheel 194 through insulated chamber 182 into chamber 166 of feed unit 156. Energization of motor 190 also causes movement of transfer chain 172 and the vanes 174 thereon move the crushed coal through chamber 166 from inlet port 176 to outlet port 208 where it is ready to enter compacting cylinder 202. Thus, when clutch mechanism 218 effects disengagement of drive motor 216 and after motor 220 effects quick return of piston 210, the crushed coal enters compacting cylinder 202. When clutch mechanism 218 effects disengagement of motor 220, drive motor 216 effects slow movement of piston 210 and the crushed coal is forced from compacting cylinder 202 into its associated electrode chute 122.

Having now particularly described and ascertained the nature of my said invention and the manner in which it is to be performed, I declare that what I claim is:

1. In an MHD device, in combination, means having a flow channel therein for the flow of hot electrically conductive gas, heat resistant electrical insulating means supported by and inside said means having the flow channel therein and disposed along a side of said flow channel, said heat resistant insulating means having apertures on the surface thereof which confronts said flow channel, and means for supplying pressurized electrically nonconductive gas to said heat resistant insulating means for expulsion through said apertures to provide a film of nonconductive gas along said surface.

2. In an MHD device, in combination, means having a flow channel therein for the flow of hot electrically conductive gas, a heat resistant electrical insulating member supported by and inside said means and disposed along a side of said flow channel, said member having a chamber therewithin and a plurality of apertures on the surface thereof which confronts said flow channel for affording communication between said chamber and said flow channel, and means for supplying pressurized electrically nonconductive gas to said chamber in said member for expulsion through said apertures to provide a film of nonconductive gas along said surface.

3. In an MHD device, in combination, means having a flow channel therein for the flow of hot electrically conductive gas, a first heat resistant insulating member supported by said means and disposed along one side of said flow channel, a second heat resistant insulating member supported by said means and disposed along another side of said flow channel, each of said members having a chamber therewithin and a plurality of apertures on the surface thereof which confronts said flow channel for affording communication between said chamber and said flow channel, said members being arranged with respect to each other so that their chambers communicate with each other, and means for supplying pressurized electrically nonconductive gas to the chamber in one of said members for transmission thereby to the chamber in the other of said members and for expulsion through the apertures in each of said members to provide a film of nonconductive gas along their said surfaces.

4. In an MHD device, in combination, means having a flow channel therein for the flow of hot electrically conductive gas, said flow channel having a substantially rectangular configuration, first heat resistant insulating members supported along one side of said flow channel, second heat resistant insulating members supported along an opposite side of said flow channel, additional heat resistant insulating members supported along the other two sides of said flow channel, each of said insulating members having a chamber therewithin and a plurality of apertures on the surface thereof which confronts said flow channel for affording communication between said chamber and said flow channel, the chambers in said additional members communicating with the chambers in said first and second members, and means for supplying pressurized electrically nonconductive gas to the chambers in said first and second members for transmission thereby to the chambers in the said additional members and for expulsion through the apertures in each of said members to provide a film of nonconductive gas along their said surfaces.

5. The combination according to claim 4 wherein said first and second members are arranged in double rows on their respective sides of the flow channel.

6. In an MHD device, in combination, means having a flow channel therein for the flow of hot electrically conductive gas, heat resistant insulating members supported by said means and disposed along a side of said flow channel in two rows so that a member in one row is adjacent to a member in the other row, each of said adjacent members having a chamber therewithin and a plurality of apertures on the surface thereof confronts said flow channel for affording communication between said chamber and said flow channel, and said adjacent members mating to afford communication between the chamber therein, means defined by said mating adjacent members to afford access to said chambers, and supply means extending through the said means having the flow channel therein and communicating with the said means which afford access to said chamber, said supply means adapted to provide pressurized electrically nonconductive gas to said chambers in said adjacent members for expulsion through said apertures to provide a film of nonconductive gas along said surface.

7. In an MHD device, in combination, means defining a flow channel for the flow of hot electrically conductive gas axially therethrough, electrode means along two opposite sides of said flow channel, means for providing a magnetic field in said flow channel transverse to a path between electrode means on opposite sides of said flow channel, and a heat resistant insulating member disposed along a side of said flow channel, said member having a chamber therewithin and having apertures on the surface thereof which confronts said flow channel for accommodating the flow of electrically nonconductive gas from said chamber to provide a film along said surface, and said member having grooves in said surface which are disposed in the same direction as the axis of said flow channel to inhibit short circuiting between said electrode means across said surface.

References Cited by the Examiner

UNITED STATES PATENTS 3,048,966 8/62 Feraud et al. ---------- 60—35.4

FOREIGN PATENTS 738,511 10/55 Great Britain.

OTHER REFERENCES

Power, Design and Equipment Section, November 1959, pp. 62 to 65.

MILTON O. HIRSHFIELD, *Primary Examiner.*

DAVID X. SLINEY, *Examiner.*